United States Patent [19]
Peacock

[11] Patent Number: 5,445,010
[45] Date of Patent: Aug. 29, 1995

[54] LEAK DETECTION OF UNDERGROUND OR OTHERWISE INACCESSIBLE LIQUID STORAGE TANKS

[76] Inventor: Clifford T. Peacock, 8 Cliff Lane, Brierley, Nr. Barnsley S72 9HR, England

[21] Appl. No.: 275,147

[22] Filed: Jul. 14, 1994

[30] Foreign Application Priority Data

Jul. 15, 1993 [GB] United Kingdom ............... 9314637

[51] Int. Cl.⁶ .................. G01M 3/30; G01N 3/26
[52] U.S. Cl. .......................... 73/49.2; 73/40; 340/605
[58] Field of Search ............... 73/49.20, 40; 340/605

[56] References Cited

U.S. PATENT DOCUMENTS

| | | | |
|---|---|---|---|
| 3,218,856 | 11/1965 | Bossard | 73/40 |
| 3,939,383 | 2/1976 | Alm | 317/123 |
| 4,474,054 | 10/1984 | Ainlay | 73/49.2 |
| 4,791,814 | 12/1988 | Nee | 73/49.2 |
| 4,796,469 | 1/1989 | Brown et al. | 73/49.2 |
| 4,893,498 | 1/1990 | Jensen | 73/49.2 |
| 5,107,699 | 4/1992 | Mastandrea | 73/49.2 |
| 5,254,976 | 10/1993 | Schueler | 340/605 |

Primary Examiner—Hezron E. Williams
Assistant Examiner—J. David Wiggins
Attorney, Agent, or Firm—Trexler, Bushnell, Giangiorgi & Blackstone, Ltd.

[57] ABSTRACT

A test procedure for the testing liquid storage tanks, for leakage, comprises: immersing at least part of test equipment in the liquid in question and fixing the equipment in position with respect to the tank; allowing a quantity of the liquid in question to be admitted to a multiplier tube, until the level of liquid in the multiplier tube equates to that in the tank; isolating the liquid in the multiplier tube from that in the tank for an appropriate test period; introducing a predetermined measure (M) of liquid of the same nature as that in the tank into the test equipment to establish a recordable datum level removing the predetermined measure (M) of liquid from the test equipment; re-connecting the liquid in the multiplier tube with that in the tank; waiting a prescribed period of time; taking the same measure (M) of liquid and re-introducing this measured amount into the test equipment; and observing any fall of the meniscus of that measure from the previous datum level, which fall would indicate leakage from the tank. The invention also includes test equipment (9).

8 Claims, 1 Drawing Sheet

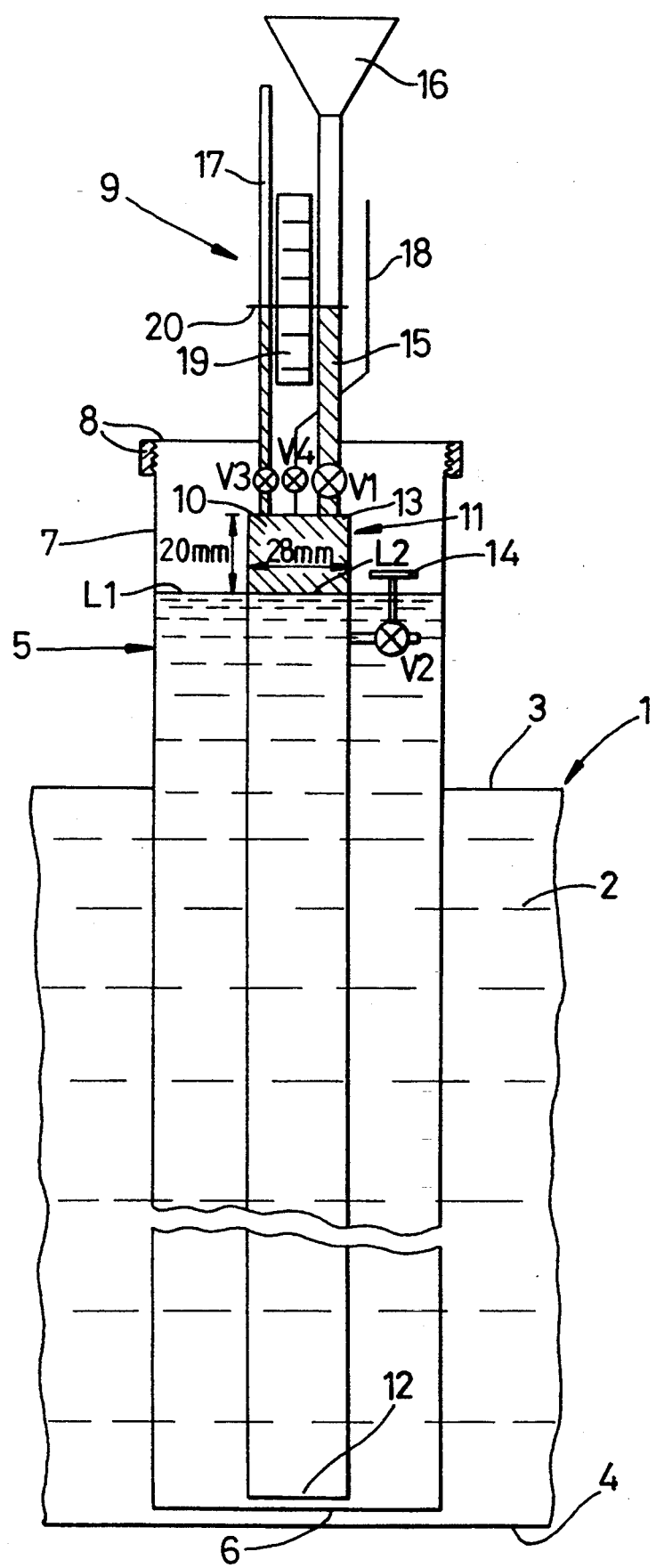

LEAK DETECTION OF UNDERGROUND OR OTHERWISE INACCESSIBLE LIQUID STORAGE TANKS

BACKGROUND OF THE INVENTION

This invention relates to a test procedure for the testing of underground or otherwise inaccessible liquid storage tanks for leakage, particulary a tank that is not readily susceptible to visual inspection, typically a buried fuel storage tank of a filling station, and to equipment for carrying out this test procedure.

Conventionally, fuel storage tanks in the U.K. must, by regulation, be tested for leakage at stipulated periods to secure a licence for use from the local licensing authority. Current legislation in the U.K. requires that if leakage should be detected at a rate exceeding 380 millilitres per hour, then the tank must be taken out of service, for repair. The officially recommended test requires (i) removal of the fuel—petrol or diesel—(ii) cleaning the tank, (iii) filling the tank with water, (iv) applying an air pressure for a prescribed period, (v) thereafter determining any loss of pressure, which would indicate leakage, and (vi) removal and disposal of the now contaminated water by a licensed operator. Consequently, the tank is non-operational for a considerable period. With a view to providing an improved technique, and in particular one that most advantageously does not require removal of the fuel involved, or the wastage and disposal of thousands of gallons of contaminated water, various computer based methods and apparatus have been evolved, but these are understandably relatively expensive and usually require highly specialised and trained operatives.

SUMMARY OF THE INVENTION

According to a first aspect of the present invention there is provided a test procedure for the testing liquid storage tanks, for leakage, comprising:

(1) immersing at least part of test equipment in the liquid in question and fixing the equipment in position with respect to the tank;

(2) allowing a quantity of the liquid in question to be admitted to a multiplier tube, of relatively large diameter (e.g. 28 mm), forming part of the test equipment, until the level of liquid in the multiplier tube equates to that in the tank;

(3) isolating the liquid in the multiplier tube from that in the tank for an appropriate test period;

(4) introducing a measure (M) of liquid of the same nature as that in the tank into the test equipment to establish by the meniscus of that measure a recordable datum level within a transparent tube of relatively small diameter (e.g. 2 mm) also forming part of the test equipment;

(5) removing the predetermined measure (M) of liquid from the test equipment;

(6) re-connecting the liquid in the multiplier tube with that in the tank;

(7) waiting a prescribed period of time;

(8) taking the same measure (M) as in step (4) of liquid of the same nature as that in the tank and reintroducing this measure into the test equipment; and (9) observing any fall of the meniscus of that measure from the datum level established in step (4), which fall would indicate leakage from the tank.

The difference in diameter between the transparent tube and the multiplier tube results in the latter acting as a multiplier chamber, whereby changes in the level of the meniscus of the measure (M) are readily discernable within the transparent tube by the human eye, particulary if, in accordance with a preferred feature, a vertically extending scale is provided on the test equipment, adjacent the transparent tube for meniscus level measurement. Naturally, during the test procedure, all outlets from the storage tank e.g. to petrol pumps, need to be blanked off and vented.

It is further preferred that the test procedure is effected in a zone of reduced free area within the tank. Such a zone would be the conventionally provided access manhole (typically of 18 inches diameter) of a petrol storage tank, or better still in the conventionally provided tank fill pipe (typically of 4 inches diameter) of a petrol storage tank. Furthermore, the test procedure is rendered easier from the operational viewpoint if, in accordance with another preferred feature the tank is filled e.g. to 6 inches below the top of the tank fill pipe with the liquid involved.

The measure (M) may be removed e.g. from the fill pipe, and returned to the fill pipe after use. Alternatively, before commencing the test procedure, a quantity of liquid e.g. 1 litre, may be removed from the tank, conveniently from the fill pipe, to serve as a surface store for adding measure (M), but if this is done the measure (M) must be extracted from the test equipment and e.g. returned to the store, rather than allowing the measure to drain back into the tank.

Further preferred features of the method include the steps of:

(5A) removing from the tank fill pipe an amount of liquid equal to the leakage that is legally required to be detected by the equipment i.e. in the U.K. 380 ml per hour or 38 ml in six minutes;

(6A) re-connecting the liquid in the multiplier tube with that in the tank;

(7A) after the two levels have had time to equate, isolate the liquid in the multiplier tube from the liquid in the fill pipe and tank;

(8A) taking the same amount (M) of liquid from the tank fill pipe as in step (4) and introduce it into the equipment by way of the funnel;

(9A) noting the height of the meniscus which gives the height to which a leak of 380 ml per hour would cause it to fall;

(10A) reconnecting the liquid in the multiplier tube with that in the fill tube;

(11A) taking from the tank fill pipe the precise amount (M) of liquid taken in step (4) and introduce (M) into the equipment and noting the height of the meniscus;

(12A) waiting for one hour or six minutes according to whether 380 ml or 38 ml were removed;

(13A) reconnecting the liquid in the multiplier to that in the tank;

(14A) waiting until the two levels have equated;

(15A) isolating the liquid in the multiplier tube from that in the tank; and (16A) taking from the tank an amount (M) of liquid equal to that in step (4) and introduce it into the equipment noting the height of the meniscus.

If the distance between the levels noted in 11A and A is greater than the distance between the levels in 9 and 4 then a leak of more than 380 ml is indicated.

According to a second aspect of the invention there is provided test equipment for carrying out the above defined test procedure capable of being immersed, at least partially, within the liquid of the tank to be tested, comprising:

(a) means to fix the equipment in position;
(b) multiplier tube;
(c) valve means to permit, in an open condition, the liquid to enter and to rise in the multiplier tube to a level representing the surface level of the liquid involved, and in a closed condition to isolate the liquid within the multiplier tube from that of the tank;
(d) means to introduce into the test equipment, and to remove from a test equipment, the same predetermined measure of liquid (M) of the same nature as that in the tank; and
(e) means to enable the user of the equipment to establish datum liquid levels of the meniscus of the measure (M) to determine the extent of any fall in level, over the test period, thus indicating leakage from the storage tank being tested.

The test equipment preferably incorporates a filler tube e.g. of 8 mm internal diameter, to serve as the means to introduce the liquid measure (M), preferably with the aid of a funnel. Such a filler tube conveniently extends upwardly from an upper, terminal end of the multiplier tube, which is preferably of copper, with a manually operable valve (V1) to connect or isolate the filler tube with respect to the multiplier tube.

The means to establish datum levels preferably comprises a transparent tube, which also conveniently extends upwardly from the same terminal end and again incorporates a manually operable valve (V3). Although the meniscus levels could be marked on the transparent tube by a suitable marker pen, preferably a vertically extending scale is provided on the equipment, along side the transparent tube, so that meniscus levels can be noted and recorded.

Although the prescribed period of step (7) of the test procedure in accordance with the first aspect would typically be six minutes, in which time period temperature variations of the liquid and consequent volume changes would be insignificant, there could be conditions in which temperature changes should be accounted for and consequently the equipment may be provided with a third tube e.g. of 1 mm diameter extending upwardly from the upper end of the copper multiplier tube, again with an interposed isolating valve (V4).

A manually operable valve (V2) is also associated with the copper multiplier tube and conveniently is located at a known distance downwardly from the upper end of the copper multiplier tube so that, when carrying out step (1), as soon as this valve disappears below the surface of the liquid the operator is aware that the test equipment is in a suitable operational position with respect to the tank and therefore can be fixed in position. It follows that step (2) of the test procedure is effected by opening valve (V2), whilst venting of the interior of the copper multiplier tube to atmosphere is effected by opening valve (V1).

For the testing of fuel tanks, the test equipment should preferably be of copper, brass or polythene, so that the accidental dropping of a tool would not cause a spark and also because copper is an excellent conductor of heat.

Instead of providing a vertically extending scale, the measuring tube itself (which naturally needs to be of material e.g. alkathene, inert to the liquid under test), may be calibrated in millilitres.

In detail, the conventional tank fill pipe cap is unscrewed to gain access to the interior of the fill pipe. The tank is then overfilled with the liquid in question so that the liquid extends e.g. to 6 inches from the top of the fill pipe. The copper multiplier tube is inserted down the tank fill pipe so that a lower part of the copper multiplier tube extends down to, or in close proximity to, the bottom of the tank, while an upper part of the copper tube projects above the upper surface of the liquid within the filler tube.

There is inconsequential evaporation of e.g. petrol, from the upper surface of the liquid in the tank under test, and consequently evaporation does not distort the test result, while simple multiplication of any fall in level, in millilitres, indicates whether any leakage detected is or is not within the 380 ml/h loss permissible by UK law.

Thus, the invention not only provides a testing technique and equipment in which the liquid e.g. fuel, may be left in situ during the test, but also one utilising relatively simple and hence cheap equipment operable by persons with minimum training, within perhaps a total test time of approximately 30 minutes.

In practice, for the testing of a fuel tank, the equipment in accordance with the invention clearly needs to be of such dimensions that it may be fitted, with relative ease, down the conventionally-provided manhole, or preferably fill pipe, to be immersed, partially, in the exposed upper surface of the fuel level within the manhole or tank fill pipe.

As indicated previously, before effecting a leakage test in accordance with a first aspect of the invention, it may be desirable or necessary to calibrate the measuring tube. This may be effected by, briefly, adding a predetermined quantity of the liquid in question, marking the level in the measuring tube, opening the valve so that the same quantity drains back into the tank fill pipe, removing 380 m/l from the tank fill pipe to simulate a leak of this magnitude, closing the valve, introducing for the second time the predetermined quantity, waiting for the appropriate time according to the amount removed to simulate the leak, and marking the level of the meniscus: a leak is shown if the distance between this level and the level after the 380 ml were removed is greater than the distance caused by the removal of the 380 ml.

BRIEF DESCRIPTION OF THE DRAWING

The invention will now be described in greater detail, by way of example, with reference to the accompanying drawing, which is a diagrammatic sectional view through test equipment in connection with a second aspect of the invention located in a fill pipe of a liquid fuel storage tank, for carrying out the method of the first aspect of the invention.

DETAILED DESCRIPTION OF THE ILLUSTRATED EMBODIMENT

A liquid fuel storage tank 1 containing liquid 2 e.g. petrol, has among other things, a top 3, a bottom 4 and a fill pipe 5 having a lower end 6 adjacent the bottom 4 of the tank and an upper end 7 projecting above the top 3 of the tank, and a screw-on closure cap 8.

To enable test equipment 9 in accordance with the second aspect of the invention to be installed in the fill pipe 5, it is first necessary to remove the cap 8 and then it is preferred to fill the tank and tank fill pipe to about 6 inches from the top of the latter.

The test equipment 9 comprises a copper multiplier tube 11 e.g. of 28 mm diameter, having a closed lower end 12 and a one way valve near e.g. six inches away from the bottom, and closed upper end 13. Downwardly spaced from the upper end 13 is a manually operable valve V2 whereby the interior of the copper tube 11 may be put into communication with, or isolated from, the liquid in the fill pipe 5 and hence the tank 1, by suitable rotation of an operating handle 14 extending upwardly from the valve V2.

From the upper end 13 of the copper tube 11 extends upwardly firstly a filler tube 15 e.g. of 8 mm diameter, with a manually operable valve V1 and terminating at its upper end in a funnel 16; secondly a transparent measuring tube 17 e.g. of 2 mm diameter, with a manually operable valve V3, and thirdly a temperature tube 18 e.g. of 1 mm diameter, with a manually operable valve V4. Along side the transparent measuring tube 17 is a vertically extending scale 19 by which a datum line 20 can be established.

In use, after removal of the cap 8, the test equipment 9 is lowered into the fill pipe 5 until the majority of the copper tube 11 is immersed in the fuel 2, and to aid the operator, the location of valve V2 may be such that the equipment 9 is in a suitable location when the valve V2 just disappears below the surface level L1. The equipment 9 is then fixed in position with respect to the fill pipe 5/tank 1 by any suitable means, and in this position an upper end of the copper tube 11 would project above the surface level L1 of the fuel by approximately 20 mm.

The equipment 9 is now ready for use and firstly valve V2 is opened to allow fuel to enter the interior of the copper tube 11, with the resulting displaced air being vented to atmosphere by opening valve V1. After a suitable period of time the surface level L2 of the liquid in the copper tube 11 will equate to the surface level L1 in the fill pipe 5, with no liquid in the upper interior 10 of the copper tube 11 and at this stage the valve V2 is closed to isolate the liquid in the copper tube 11 from that in the fill pipe 5/tank 1.

A predetermined measure (M) of liquid is then extracted from the fill pipe 5 and is introduced into the test equipment 9 via the funnel 16, filler tube 15 and open valves V1 and V3. The measure needs to be sufficient to ensure that not only is the upper interior 10 of the copper tube 11 filled, but also the transparent measuring tube up to a datum line 20. Obviously, the level in the filler tube 15 would also be at the same datum line 20. The operator then takes and records a scale reading at the datum line 20, after which the valve V2 is opened to return the liquid measure M to the fill pipe 5 and to reconnect the test equipment 9, and in particular the interior of the copper tube 11, with the liquid 2 in the fill pipe 5/tank 1. When the levels in the multiplier tube and fill pipe equate, the valve V2 is closed.

There is now removed 38 ml that is 38/10, from the liquid in the fill pipe to simulate a leak. The valve V2 is then opened so that the levels in the multiplier tube and the tank fill pipe will again equate and the meniscus will be lower: distance between the two readings is noted.

The valve V2 is again closed and after a period of 6 minutes, one tenth of an hour, the amount (M) is taken from the tank fill pipe and put down the funnel 16. If the distance between the height of the meniscus and the last reading exceeds the distance shown, to be due to the removal of 38 ml then a leak of 380 ml is shown. If it be suspected that a change of temperature may have had a significant influence on the result, then the effect of any heat change may be dealt with as follows:

the valve V2 is closed and an amount of liquid poured down the funnel until the meniscus is at a suitable level and the height of the meniscus noted, then valves V3 and V1 are closed. Any change in volume is due to heat only. The difference between the meniscus levels at the same period of time as before i.e. 60 minutes or 6 minutes, enables the volume increase or decrease to be calculated: the ratio of that volume increase to the volume in the multiplier tube will be in the same proportion as the volume increase or decrease in the storage tank.

In detail, a 2 mm internal diameter transparent tube has been found in tests, to give sufficient accuracy, and a copper tube 11 of 1.5 m length has a volume of $150 \times 5 = 750$ ml. A temperature change of 0.01 degree will give a volume change of $0.00067 \times 0.01 \times 750 = 0.005$ ml. The area of a 2 mm tube is 0.03 $cm^2$ and a change of level of $0.005/0.03 = 0.17$ cm is measurable, whilst a 0.01 degree change gives a volume change of 67 ml in a 10,000 litre tank.

Some mathematics can be avoided if the scale is calibrated by extracting 38 ml from the tank fill-pipe i.e. 0.1 of the 380 ml, it represents a loss in 6 minutes of the 380 ml per hour leak stipulated. Valves V1, V2 and V3 are now opened so that the levels in the tank fill-pipe 11 and in the equipment are level. Valve V2 is now closed and volume Q is extracted from the tank fill-pipe 11 and poured down the 8 mm filler tube 15; this shows the level after a leak of 38 ml and is noted.

The difference in height shows the effect of a 38 ml leak.

If considered necessary pipe 18 may be employed to compensate for volume expansion and contraction of the liquid 2 due to changes in temperature during the test procedure. Thus the change may be ascertained by closing Valve V2, extracting liquid 2 from tank fill-pipe 11 and pouring it down the 8 mm filler-tube 15 until the meniscus reaches a convenient height in the 1 mm tube 18. Valves V1 and V3 are then closed. After 6 minutes the height of the meniscus is noted. The change in volume will be in proportion to the volume of the apparatus contents and will be in proportion to any change in the tanks contents.

It would be possible, in principle, to test a partly filled tank by using a chamber of e.g. 15 inches diameter and a shallow depth of e.g. 3 inches depth in place of the multiplier tube and at the same time, the means for testing in a 4 inches diameter tank fill pipe could be used for measuring any change in volume due to change in temperature.

I claim:

1. A test procedure for testing liquid storage tanks, for leakage, comprising:
    (1) immersing a lower part of test equipment in the liquid in question and fixing the equipment in position with respect to the tank with an upper part of said equipment above, and external to, said tank for visual read-out;
    (2) allowing a quantity of the liquid in question to be admitted to a multiplier tube, of relatively large diameter (e.g. 28 mm), forming part of the test equipment, until the level of liquid in the multiplier tube equates to that in the tank;
    (3) isolating the liquid in the multiplier tube from that in the tank for an appropriate test period;

(4) introducing into a transparent measuring tube which extends above, and externally of, said tank a measure (M) of liquid of the same nature as that in the tank into the test equipment with said measure (M) being of sufficient volume such that the liquid level in said multiplier tube rises up to partially fill said transparent measuring tube, which is of relatively small diameter (e.g. 2 mm), thereby yielding a visible meniscus reading at the portion of the test equipment above, and external to, the storage tank; a transparent tube of relatively small diameter (e.g. 2 mm) also forming part of the test equipment;

(5) removing the predetermined measure (M) of liquid from the test equipment;

(6) re-connecting the liquid in the multiplier tube with that in the tank;

(7) waiting a prescribed period of time;

(8) taking the same measure (M) as in step (4) of liquid of the same nature as that in the tank and re-introducing this measure into the test equipment; and (9) observing any fall of the meniscus of that measure from the datum level established in step (4), which fall would indicate leakage from the tank.

2. A test procedure as claimed in claim 1, wherein leak testing is effected in a zone of reduced free area within the tank defined by an access manhole or fill pipe of said storage tank.

3. A test procedure as claimed in claim 1, wherein the tank is over-filled with the liquid involved.

4. Leakage test equipment for a liquid containing storage tank, said equipment being partially immersable within said liquid contained in said tank, said equipment comprising:

(a) means to fix said equipment to an access manhole or fill pipe of said tank with a lower part of said equipment immersed in said liquid and an upper part of said equipment above, and external to said tank for visual read-out;

(b) elongate multiplier tube means fixable in position by said fixing means in a partially immersed position;

(c) valve means carried by said multiplier tube means to permit; in an open condition, said liquid to enter into and to rise in, said multiplier tube to a suitable level, and, in a closed condition, to isolate said liquid within said multiplier tube from that of said tank;

(d) a transparent measuring tube extending upwardly from said multiplier tube means externally to said tank for visual read-out and of relatively small diameter compared with said multiplier tube means; and (e) means to introduce into said measuring tube via said multiplier tube means, and to remove from the said measuring tube also via said multiplier tube means, liquid of the same nature of that in the tank to enable the user of the equipment to establish in said measuring tube externally of said tank a datum liquid level of the meniscus of said liquid to determine the extent of any fall in level, over the test period, thus indicating leakage from the storage tank being tested.

5. Test equipment as claimed in claim 4, comprising a filler tube e.g. of 8 mm internal diameter, connected to, and extending upwardly from, said multiplier tube means to serve as the means to introduce the liquid measure (M), with a manually operable valve (V1) to connect or isolate the filler tube with respect to the multiplier tube.

6. Test equipment as claimed in claim 4, wherein the transparent tube, incorporates a manually operable valve.

7. Test equipment as claimed in claim 4, wherein a vertically extending scale is provided on the equipment, along side the transparent tube, so that meniscus levels can be noted and recorded.

8. Test equipment as claimed in claim 4, wherein a third tube is provided, again with an interposed isolating valve, for temperature compensation.

* * * * *